United States Patent [19]

Padgaonkar et al.

[11] Patent Number: 5,014,191
[45] Date of Patent: May 7, 1991

[54] SECURITY FOR DIGITAL SIGNAL PROCESSOR PROGRAM MEMORY

[76] Inventors: Ajay J. Padgaonkar, 9617 S. 43rd Pl., Phoenix, Ariz. 85044; Sumit K. Mitra, 8860 S. Drea La., Tempe, Ariz. 85284

[21] Appl. No.: 189,189

[22] Filed: May 2, 1988

[51] Int. Cl.$^5$ .............................................. G06F 12/14
[52] U.S. Cl. .................................. 364/200; 364/246.6
[58] Field of Search ... 364/200 MS File, 900 MS File; 265/218

[56] References Cited

U.S. PATENT DOCUMENTS

| | | | |
|---|---|---|---|
| 4,183,085 | 1/1980 | Roberts et al. | 364/200 |
| 4,184,201 | 1/1980 | Melberg et al. | 364/200 |
| 4,513,174 | 4/1985 | Herman | 364/200 |
| 4,519,032 | 5/1985 | Mendell | 364/200 |
| 4,521,853 | 6/1985 | Guttag | 364/200 |
| 4,583,196 | 4/1986 | Koo | 364/900 |
| 4,584,665 | 4/1986 | Vrielink | 364/900 |
| 4,698,750 | 10/1987 | Wilkie et al. | 364/200 |

Primary Examiner—Michael R. Fleming
Assistant Examiner—Debra A. Chun
Attorney, Agent, or Firm—Donald R. Greene

[57] ABSTRACT

The processor executes programs from an internal EEPROM or from an external source. The EEPROM can be read either by a special operating (test) mode of the processor or by an instruction executing under normal operating mode from the EEPROM or from an external source. Similarly, the EEPROM can be programmed (written) either by a special operating mode or by under a normal operating mode instruction. The read and write circuits for the EEPROM are controlled to provide two levels of security against piracy of programmed information. In the first level, access is prevented for the read and write test modes and also for the read and write normal operating instructions if the instructions originate from an external source. In the second level, program execution from external source is also disabled.

3 Claims, 4 Drawing Sheets

SECURITY FOR DIGITAL SIGNAL PROCESSOR PROGRAM MEMORY

BACKGROUND OF THE INVENTION

The present invention relates to electronic memory devices and more particularly to circuitry for securing an electronic memory from piracy of the data stored in it.

A digital signal processor is a high speed microcomputer usable for applications requiring digitally adaptive, secure, and intelligent signal processing. Such processors may be used to accomplish pattern recognition, adaptive control storage, intelligent finite impulse filtering, linear circuit control, encryption, diagnostics, precision servo control, voice band data processing and many other applications. They find use, for example, in industrial robots to synthesize and recognize speech, sense objects with radar or optical intelligence and perform mechanical operations through digital servo loop computations. They are also used in direct broadcast satellite systems for implementing encryption algorithms.

Processors of this type include an internal memory which stores data. This data comprises both program instructions and constants. The data may include certain proprietary information which must be protected from unauthorized access and alteration.

The present invention relates to a digital signal processor called DSP320EE12, which shares many features of the DSP320C10, a commercially available device produced by Microchip Technology Incorporated, Chandler, Ariz. However, the DSP320EE12 also includes an improved internal program memory in the form of an integrated electronically erasable and programmable read only memory (EEPROM) with a 2.5K word (40K bits) capacity and an expanded internal data RAM (static) with a 256 word (4K bits) capacity.

Although the DSP320EE12 uses EEPROM, the concept of providing an internal security for program memory is more generic and is applicable to other erasable internal program memories such as EPROM, RAM and NVRAM. Also, although the DSP320EE12 is a digital signal processor, the concepts of this invention are applicable to any processor with on chip memory.

The improved processor has a unique addressing system which is disclosed in copending application Ser. No. 191,983, filed May 9, 1988 and entitled "Method And Apparatus For Controlling The Movement Of Data In A RAM Of A Digital Signal Processor." The improved digital signal processor also has the capability of programming the internal EEPROM at the same time as a program is being executed, as described in copending application Ser. No. 191,984, filed May 9, 1988, entitled "Digiital Signal Processor With Run Time Programming Capability." The reader is referred to those applications for further details of those aspects of the processor.

SUMMARY OF THE INVENTION

The present application relates to apparatus for protecting the security of the internal program memory to prevent unauthorized access thereto. Two levels of security are implemented to protect information, such as proprietary algorithms, in the internal program memory. At the first level of security, access to the internal program memory is disabled if the instruction to program or read the internal program memory originates from an external program source. Both write and read "test modes" are also disabled. The term test modes is used to denote special operating modes activated when the processor is held in reset. These are reserved for operations such as read or program (write). The term "test" is employed because these operating modes are commonly used for testing of the circuits at the factory. At the second level of security, in addition to the above measures, execution of any program from an external source is disabled.

Using the first level of security, a user may keep proprietary subroutines in the internal program memory and still execute programs from an external source. Once protected, the only way to alter the information in the internal program memory is to erase it and the protection keys simultaneously. If a CHIP ERASE test mode is invoked, it will erase both the internal program memory and the protection keys (thus unprotecting the internal program memory). During the CHIP ERASE operation, the protection keys are erased only after the internal program memory is erased.

It is a prime object of the present invention to provide security for a digital signal processor program memory so as to protect proprietary information from being altered or read.

It is another object to provide security such that instructions that read and write to the internal program memory are disabled if the instructions originate from external program source but the same instructions are permitted to execute if they originate from the internal program memory.

It is another object to provide security from special operating modes that can read and write to the internal memory by disabling them.

It is another object to provide a second level of security whereby only programs from internal program memory can execute and programs from external program source are inhibited.

It is another object of the present invention to provide security against disabling of the security signal generator by means of a special mode instruction by causing the memory to be automatically erased upon receipt of such an instruction.

In accordance with the objects above, apparatus is provided for protecting the security of an internal program memory in a digital signal processor source. The processor has means for selecting the memory or the external source as the program source. Means are provided for executing a program from the selected source. The program source provides for accessing the memory in accordance with the instructions (normal operating mode).

The apparatus also comprises means for generating a security signal and means for controlling the memory access means. The controlling means comprises means for sensing the presence of the security signal. Means are provided for detecting whether the program being executed is from the external source. Means are provided for disabling the access means if the program is from the external source and the security signal is present.

The program includes instructions to read (TBLR) or program (TBLW) the memory. The controlling means disables the access means if such instructions originate from the external source and the security signal is present.

The processor is adapted to receive non-program generated (test mode) memory access instructions. The accessing means is adapted to access the memory in accordance with a non-program generated access instruction. Means are provided for transferring data from the memory when accessed. The apparatus further comprises means responsive to the security signal for disabling the data transfer means in response to a non-program generated access instruction.

Means are provided for programming the memory in response to a non-program generated access instruction. The apparatus further comprises means, responsive to the security signal, for disabling the programming means, in response to a non-program generated access instruction.

Means are provided for generating a second security signal. The data transfer means disabling means is responsive to the second security signal. The means for disabling the programming means is also responsive to the second security signal.

Means, responsive to the second security signal, are provided for disabling the program execution means. These means are active when the selected program is from the external source.

The processor is adapted to receive a non-program generated security signal generating means disable instruction (CHIP ERASE). Means are provided to disable the security signal generating means and erase the contents of the memory simultaneously upon receipt of such instruction.

In accordance with another aspect of the present invention, apparatus is provided for protecting the security of an internal memory in a digital signal processor of the type adapted to receive non-program originated (test mode) memory access instructions. The apparatus comprises means executing instructions from an external source or the internal memory. Means are provided for accessing the memory in accordance with the non-program generated access instructions. Means are provided for transferring the data from the memory when accessed. Means are provided for detecting the security signal and for disabling the transfer means in response to the security signal and a non-program related access instruction.

Means are provided for programming the memory in response to a non-program generated access instruction. Means are provided for disabling the programming means in response to the security signal and a non-program generated access instruction.

BRIEF DESCRIPTION OF THE DRAWINGS

To these and such other objects which may hereinafter appear the present invention relates to security for a digital processor program memory as set forth in detail in the following specification and recited in the annexed claims taken together with the accompanying drawings in which like numerals refer to like parts and in which:

DESCRIPTION OF THE PREFERRED EMBODIMENT

Figure 1:
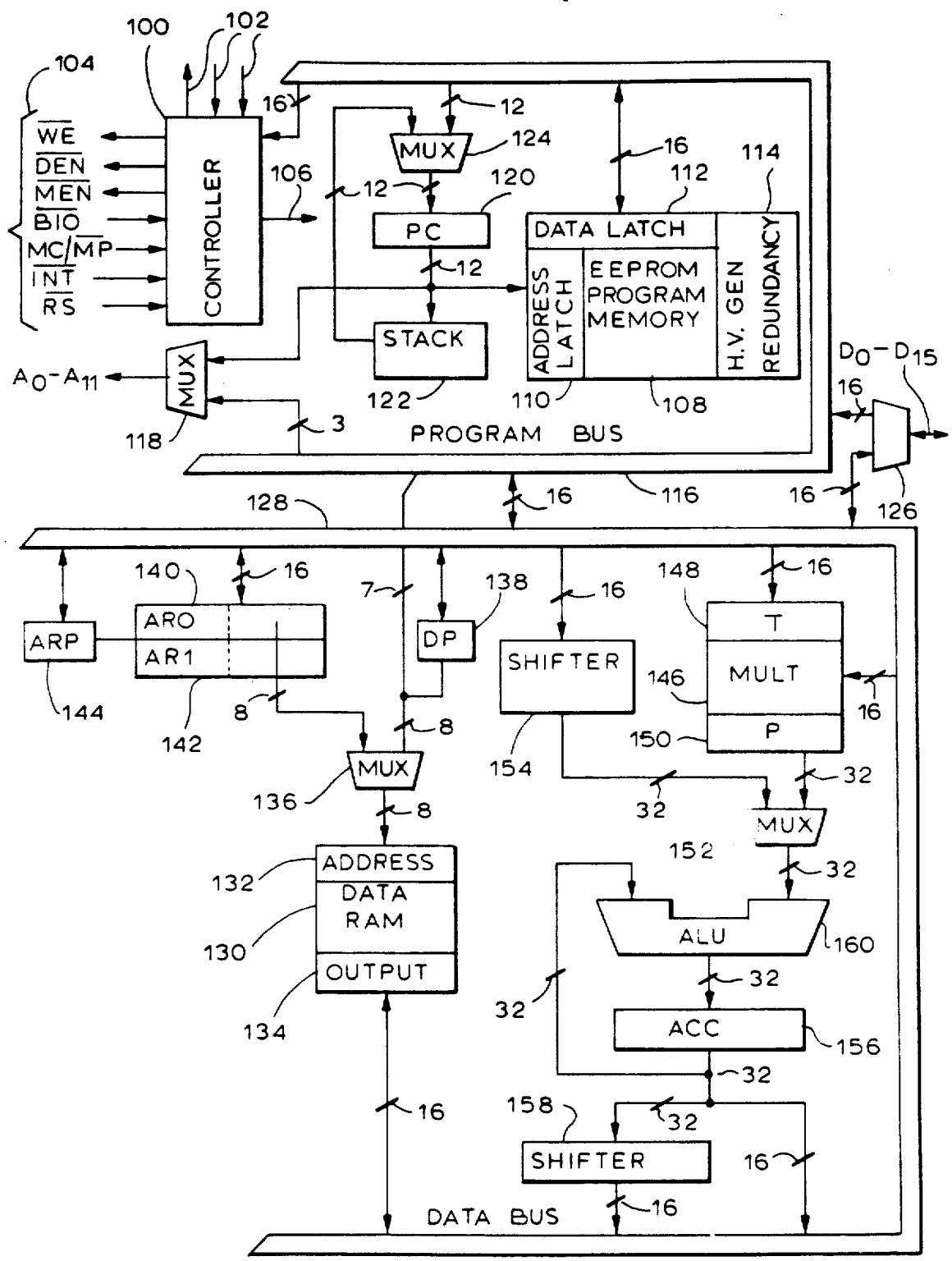
FIG. 1 is an overall block diagram of the digital signal processor of the present invention.

FIG. 1 illustrates the components and general architecture of the digital signal processor of the present invention. In the diagram, the various buses are provided with numbers which signify the number of parallel connections in each.

The processor utilizes a modified Harvard architecture for speed and flexibility. In a strict Harvard architecture, program and data memories lie in two separate spaces, permitting a full overlap of fetch and execution. The modification of the Harvard architecture employed herein allows transfers between program and data space, thereby increasing flexibility. This modification permits coefficients stored in the program memory to be read into the RAM, eliminating the need for a separate coefficient ROM. It also makes available subroutines based on computed values.

The processor includes a control circuit 100 having two clock inputs and a clock output 102 and various control inputs and outputs 104. The control inputs and outputs 104 include: $\overline{RS}$ (reset), $\overline{INT}$ (interrupt), $\overline{BIO}$ (bit test), MEN (memory enable to accept external memory instruction), $\overline{WE}$ (write enable—indicates valid data input), MC/MP (mode select), $\overline{DEN}$ (data enable to accept external input data). Control circuit 100 also has an output 106 which controls the functioning of an internal program memory 108 in the form of a 2.5K word (16 bit) EEPROM (electronically eraseable and programmable read only memory).

EEPROM 108 has associated with it the appropriate address circuitry 110, instruction transfer circuitry 112 and related circuits 114 such as a high voltage generator and redundancy circuits. A program bus 116 is connected to control circuit 100 and to a multiplex circuit 118 which provides external addresses (Ao-A11) for use by an external program source. The other input to multiplex circuit 118 is the output of a program counter circuit 120, which is also connected to address circuit 110 and the input of a stack 122 which saves the contents of program counter 120 during program interrupts and subroutine calls.

The output of stack 122 is fed back to one of the inputs to a multiplex circuit 124. The other input of circuit 124 is connected to program bus 116. Program bus 116 is also connected to a multiplex circuit 126 which acts as an input/output port for data and is connected to data pins Do-D15.

A data bus 128 is connected directly to program bus 116 for data transfer therebetween. Data bus 128 can be utilized to perform input/output functions at burst rates of 50 million bits per second. Available for interfacing to peripheral devices are 128 input and 128 output bits consisting of eight 16 bit multiplex input ports and eight 16 bit multiplex out ports.

Data bus 128 is connected to a 256 word (16 bit) data RAM 130 (random access memory). Thus, data transfer is possible between RAM 130 and EEPROM 108.

A parallel multiplex circuit 146 is capable of performing a 16 × 16 two's compliment multiplication in one 160 nano second instruction cycle. The 16 bit T register 148 temporarily stores the multiplicand. The P register 150 stores the 32 bit result. Multiplier values can either come from data memory 130 or are derived immediately from "multiply immediate" instruction word. This fast on chip multiplier allows the processor to perform such fundamental operations as convolution, correlation and filtering at the rate of 3 million samples per second.

The output of multiplier 146 forms one input to a multiplex circuit 152. The other input of multiplex circuit 152 is the 32 bit output of a barrel shifter circuit 154. The barrel shifter is available for left shifting data 0 to 15 places before it is loaded into, substracted from or added to the accumulator 156. The shifter extends the high bit of the data word and zero fills the low order bits for two's complement arithmetic. A second shifter circuit 158 left shifts the upper half of the accumulator zero, one or four places, while it is being stored in the data RAM 130. Both shifters 154 and 158 are very useful for scaling and bit extraction.

The process contains a 32 bit arithmetic logic unit 160 and an accumulator 156 that support double precision arithmetic. The unit operates on 16 bit words taken from the data RAM 130 or derived from immediate instructions. Besides the usual arithmetic instructions, the unit can perform Boolean operations, providing the bit manipulation ability required of a high speed controller.

Among the instructions in the repertoire of the processor are two (normal operating mode) instructions to access the program memory 108: TBLR for read and TBLW for write. The accumulator 156 holds the program memory address for both these instructions. When the TBLR instruction is executed, the data from the addressed location is read out of the program memory and copied into a location in the data memory 130 on chip (RAM). When the TBLW instruction is executed, the data is read out of a location in the data memory 130 on chip (RAM) and copied into the program memory 108. The RAM address is specified as a part of the instruction itself for both the TBLR and the TBLW.

In the processor, additional means have been provided to read and write to the internal program memory via special (test) operating modes. While the processor is held in reset condition (by holding RS pin at 0), the address can be specified on the A0-A11 pins and special operating modes can be activated by using $\overline{\text{MEN}}$, $\overline{\text{DEN}}$, $\overline{\text{WE}}$, $\overline{\text{BIO}}$, MC/MP and $\overline{\text{INT}}$ pins. The data from the addressed location will appear on the input/output data pins if the special operating mode specifies a read operation. The data to be written must be forced on the data pins when the special operating mode is a write operation.

When either TBLW or TBLR is executing and the program memory address points to the internal EEPROM, the address is transferred from the accumulator 156 over the data bus 128, via MUX 126 over the program bus 116 through MUX 124 into the program counter PC 120. From the PC, the EEPROM is addressed through the address latch 110. In case of TBLR, the data is transferred from the EEPROM, over the program bus via MUX 126 over the data bus into the RAM 130. In case of TBLW, the data is transferred over the same channels as TBLR from the RAM to the EEPROM. The controller 100 controls the data transfer by generating appropriate control signals 106.

When read or write special (test) operating modes are in operation, the program memory address comes from the external address pins through MUX 118 into the address latch 110 directly. In case of read operation, the data is transferred from the EEPROM over the program bus via MUX 126 onto the data pins D8-D15. In case of write operation, the data from the data pins is transferred through MUX 126 over the program bus 116 and into the EEPROM. The controller controls the data transfer by generating appropriate control signals 106.

Figure 2:
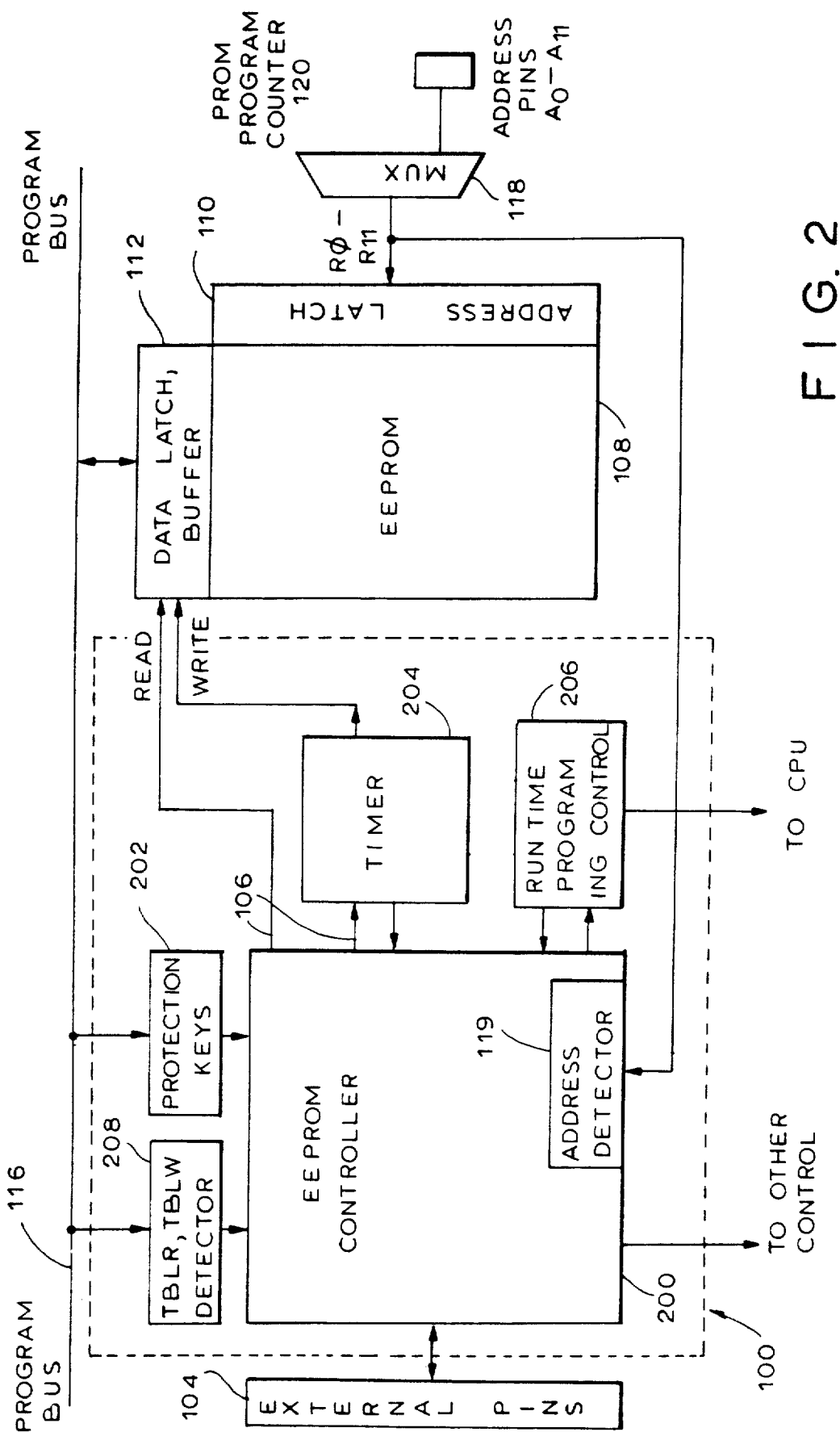
FIG. 2 is a block diagram of the components of the processor relevant to code security.

FIG. 2 is a block diagram of the components of the processor relevant to the discussion of code security. The EEPROM controller 200, which forms a portion of control circuit 100, performs several operations such as controlling the read and write operations to the EEPROM and decoding the read and write and other special operating modes specified by pins 104 and activating appropriate circuits to conduct the desired operations. The read and write operations mentioned above may be a result of program access, or TBLR, TBLW instructions or the special operating modes read and write. The protection keys 202 are special EEPROM circuits which will be described below. One bit each of the program bus is designated for the two protection keys for read and write to the protection keys. The protection keys can be programmed by specifying logic 0 on corresponding bit of the program bus and invoking the PROGRAM KEY special operating mode. The keys can be erased only by invoking the CHIP ERASE special operating mode which erases both the EEPROM contents as well as the keys.

When the operation to be performed is read or write, the address is specified either by the PC 120 or the external address pins A0-A11 through MUX 118 into the address latch 110. The address detector 119 decides if the destination address is internal (intended for external program source). When the operation is a read from the EEPROM, the EEPROM controller 200 activates the data transfer from the EEPROM onto program bus 116 directly.

When the operation is the special operating mode write to the EEPROM, the EEPROM controller 200 activates the timer 204, which in turn activates data transfer from the program bus into the data latch 112 and controls the EEPROM programming circuits 114 in a predetermined timing order. The timing order involves turning on the internal high voltage generator, erasing the destination location, writing the data from the data latch to the destination location and then turning off the high voltage generator. Further details of the programming circuits will not be discussed here since they are not relevant to this invention.

When the write operation is initiated by the TBLW instruction, a special controller called RUN TIME PROGRAMMING CONTROL 206 activates the timer which in turn acts in the same manner as described above. The RUN TIME PROGRAMMING CONTROL is described in a copending patent application listed above.

Since the EEPROM controller 200 decodes the special operating modes read and write based on the external address pins A0-A11, this decoding is merely shut off if protection keys are programmed to level 0 to 1. When TBLR executed from external memory requests a read from the EEPROM and the protection keys are programmed to level 0, the EEPROM controller disables the read operation from the EEPROM. In doing so, the EEPROM controller uses three pieces of information (1) that it is a TBLR instruction executing from external memory (2) that the destination address is internal, and (3) that the protection keys are programmed to level 0. The first piece of information comes from the TBLW/TBLR detector 208. The second piece of information comes from the address detector and the third piece of information comes from the protection keys 202. The same three circuits also aid the EEPROM controller in inhibiting the RUN TIME PROGRAMMING CONTROL when the protection keys are programmed to level 0 and a write operation to the EEPROM is requested by TBLW. When the protection keys are programmed to level 1, the EEPROM controller shuts off the signal that activates any transfers from the external program source thus inhibiting execution from such a source.

Figure 3:
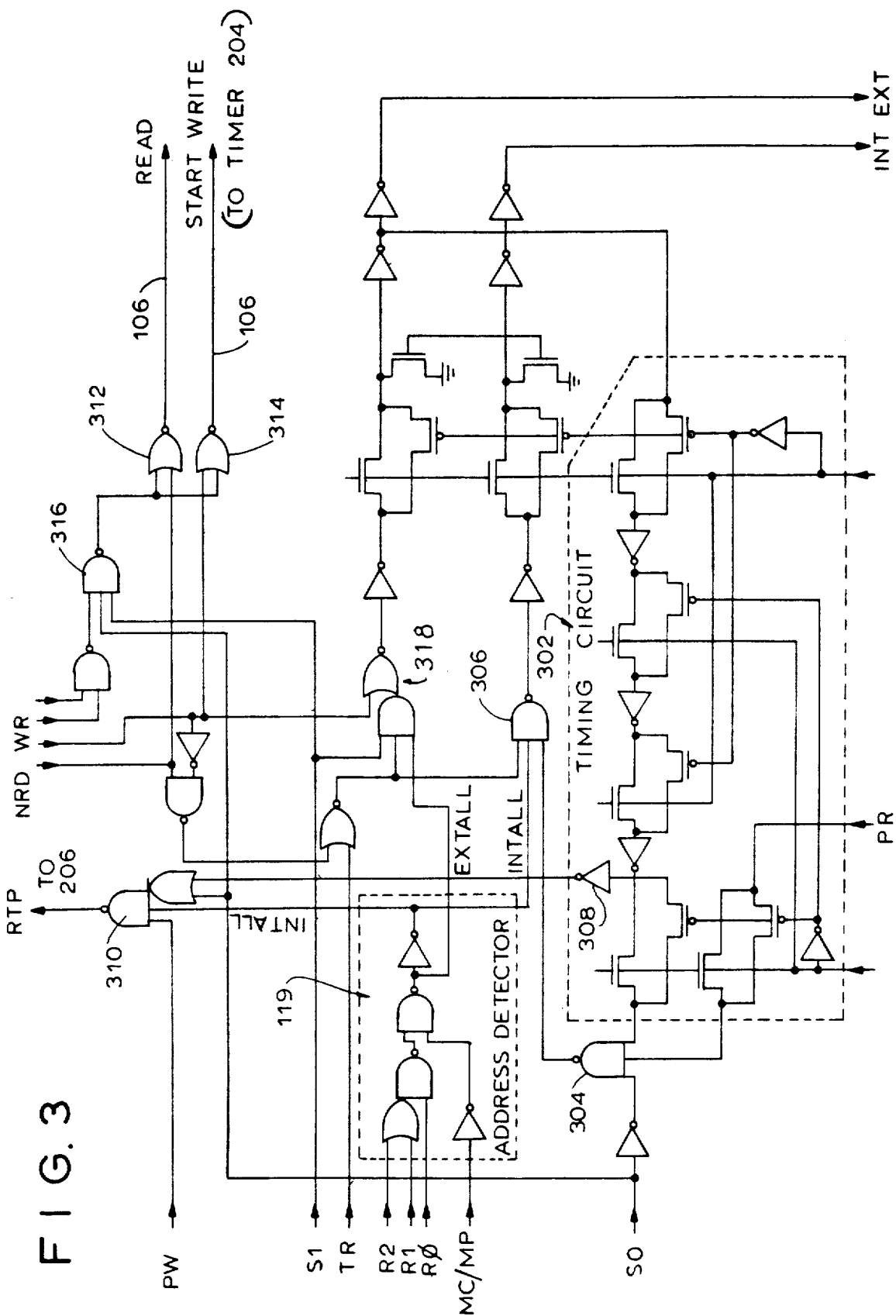
FIG. 3 is a schematic diagram of the access control circuit of the present invention.

FIG. 3 shows the actual schematic of access control circuits mentioned above. The signals S0 and S1 indicate protection levels 0 and 1, respectively. They are logic 0 when the corresponding security level is programmed. The signals INT and EXT control read access from internal EEPROM and external program source, respectively. In addition, the signal READ indicates an EEPROM read in the special operating mode read and the signal START WRITE instructs the timer to start the programming sequence. Based on the outputs of the MUX3118 and a mode control pin MC/$\overline{\text{MP}}$, the address detector 119 produces two outputs INTACC and EXTACC which are logic complements of each other, i.e., one is a 1 when the other is a 0. The signals PR and PW are outputs of the TBLR/TBLW detector 208, indicating TBLR and TBLW, respectively. The signal TR indicates a program access or TBLR access requested by the processor to either internal or external program source. The output of complex gate 310, signal RTP, is the RUN TIME PROGRAMMING detector that feeds the RUN TIME PROGRAMMING CONTROL. When this output is a 0, RUN TIME PROGRAMMING is activated.

The timing circuit 302 provides the information, that the instruction currently executing came from external program source, at the proper moment during the execution of the instruction. If S0 is 0 (level 0 programmed) and the currently executing instruction is TBLR from the external program source, then the output of the NAND gate 304 would be 0 (because all inputs are 1) and, therefore, the output of the NAND gate 306 would be a 1 and therefore the signal INT would remain 0 and no data transfer from EEPROM to the program bus 116 can take place.

The output of the inverter 308 would be 0 if the instruction currently executing originated from external program source. In addition, if the protection level is programmed to 0 then the OR part of complex gate 310 would be a 0 forcing the output of fate 310 to 1, thus disabling RUN TIME PROGRAMMING. Also, if protection keys are programmed to level 1, the output of the complex gate 310 would be forced to 1, during normal mode execution, due to input S1. This will, in turn, force signal EXT to 0 to disable external execution.

If either S0 or S1 are 0, i.e., either level 0 or level 1 protection is programmed, then the output of NAND gate 316 is 1, forcing outputs of NOR Gates e12 and 314 to be 0. Outputs 106 of NOR gates 312 and 314 (READ and START WRITE respectively) control read and write of the EEPROM in special operating modes read and write. Thus, either level 0 or 1 disables the special operating modes. None of the rest of the circuits shown in FIG. 3 is of direct relevance to this invention and, therefore, none of it will be described here.

Figure 4:
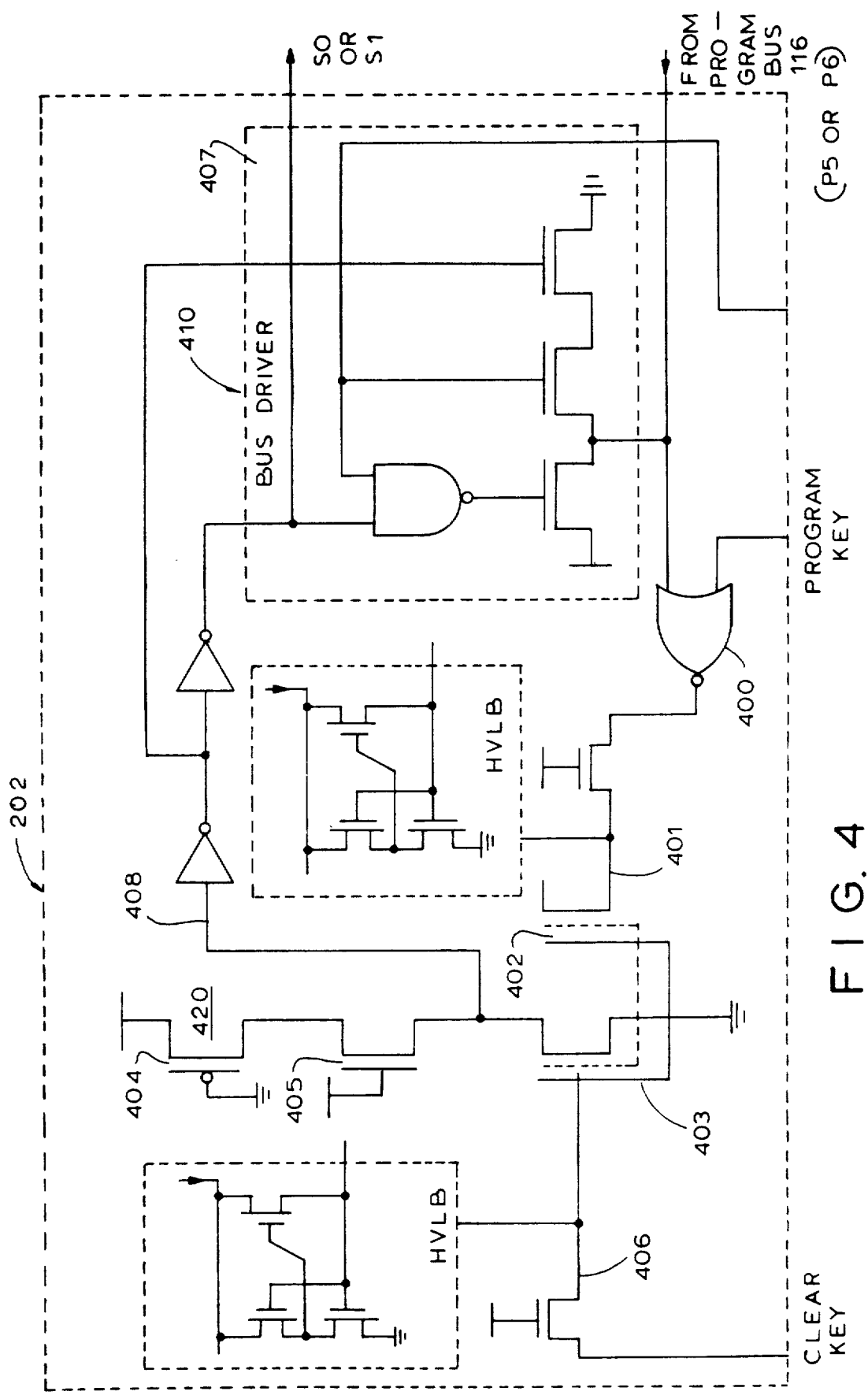
FIG. 4 is a schematic diagram of one of the two bits of the protection key circuit of the present invention.

FIG. 4 shows the actual schematics of one of the bits of the protection key. There are two such circuits, one for level 0 and the other for level 1.

When the key is to be programmed, the signal PROGRAM KEY is logic 0 and so is the corresponding program bus bit P5 or P6. The output of the NOR gate 400 is, therefore, 1. The circuit called HVLB is a High Voltage Latch. During programming and erasing of the keys, the power line VM is at high voltage 18 V. When the output of gate 400 is logic 1, the output of HVLB (node 401) is pulled up to high voltage and held there until either the output of gate 400 is logic 0 or until VM recedes to normal supply voltage (about 5 V). When the programming is in progress, the signal CLEAR KEY is logic 0 and therefore so is node 406. The EEPROM transistor 402 has its gate (node 406) at 0 V and its drain (node 401) at 18 V. Electrons tunnel through a very thin oxide layer called tunnel dielectric and get sucked away from the "floating" gate shown in dashed lines. The threshold voltage of transistor 402 is modified to be about $-2$ V (negative). Threshold voltage is the voltage at which a transistor turns on, i.e., for higher voltages it conducts, for lower voltages it does not conduct. The transistor 403 shares the "floating" gate with transistor 402, and, therefore, has the same threshold voltage of about $-2$ V. Under normal circumstances, the CLEAR KEY signal is 0 V. Therefore, a threshold of $-2$ V produces transistors 403 to conduct and current passes through transistors 404 and 405. Thus, the voltage of node 408 is close to 0 V, resulting in S0 (or S1) to be logic 0.

When the CHIP ERASE mode is activated, the CLEAR KEY signal is raised to logic 1 after and only after erasing the EEPROM (done by timing circuit 302. See FIG. 3). When the CLEAR KEY signal is logic 1, so is the PROGRAM KEY signal. The voltage at the gate (node 406) of transistor 402 is 18 V and the voltage at the drain (node 401) is 0 V. Therefore, the electrons get sucked into the "floating" gate and the threshold of transistor 402 becomes 2 V (positive). Once the key is erased, the CLEAR KEY signal becomes logic 0. Therefore, transistor 403 does not conduct and node 408 is pulled up to about 5 V through transistors 404 and 405. Transistors 404 and 405 conduct until the voltage at node 408 reaches about 5 V and then they shut off. Now the signal S0 (or S1) is logic 1 and the key is erased.

The bus driver 410 is provided to enable reading of the protection key on the program bus. It is provided only as a status indicator and serves no purpose in securing the EEPROM.

It should now be appreciated that the present invention is a digital signal processor with an internal program memory, the contents of which are protected. In a first level of security, access to the memory in accordance with instructions form an external program is prevented if a read or write operation is requested or if a read or write instruction is generated in the test mode. However, external programs can still be executed. In the second level of security, execution of external (but not internal) programs is prevented.

While only a single preferred instruction of the present invention is disclosed for purposes of illustration, many variations and modifications could be made thereto. It is intended to cover all of these modifications and variations which fall within the scope of this invention, as defined by the following claims:

We claim:

1. A microprocessor adapted to provide security with respect to information contained in internal processor memory during execution from an external program memory, comprising

- internal program memory means for storing a program to be executed by said processor with respect to incoming signals to said processor, said internal program memory means being adapted to be reprogrammed and read repeatedly in response to receipt of write and read instructions therefor,
- processing means for receiving and processing said incoming signals in accordance with said program, and
- security means for providing two levels of security against access to information contained in said internal program memory, said security means including
- means for generating a security signal when the internal program memory is to be made secure,
- means responsive to said security signal for selectively preventing access to said internal program memory upon receipt of write or read instructions therefor by said microprocessor from a source external to said microprocessor, and
- means further responsive to said security signal for selectively disabling execution of any program from a source external to said microprocessor.

2. The invention of claim 1, wherein said internal program memory has normal write and read modes and test write and read modes, and said preventing means disables both said normal modes and said test modes.

3. The invention of claim 1, further including means for bypassing the protection of said security means to permit alteration of the information contained in said internal program memory means when such alteration is initiated by a program executing from the same internal program memory means.

* * * * *